United States Patent
Zhao et al.

(10) Patent No.: US 10,587,743 B2
(45) Date of Patent: Mar. 10, 2020

(54) ELECTRONIC DEVICE CONTROL SYSTEM, AND METHOD FOR OPERATING ELECTRONIC DEVICE CONTROL SYSTEM

(71) Applicant: Samsung Electronics Co., Ltd., Gyeonggi-do (KR)

(72) Inventors: Shidong Zhao, Jiangsu (CN); Feng Tang, Jiangsu (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/513,091

(22) PCT Filed: Sep. 10, 2015

(86) PCT No.: PCT/KR2015/009519
§ 371 (c)(1),
(2) Date: Mar. 21, 2017

(87) PCT Pub. No.: WO2016/047940
PCT Pub. Date: Mar. 31, 2016

(65) Prior Publication Data
US 2017/0302779 A1    Oct. 19, 2017

(30) Foreign Application Priority Data

Sep. 22, 2014 (CN) .......................... 2014 1 0488210
Sep. 9, 2015 (KR) ........................ 10-2015-0127714

(51) Int. Cl.
*H04M 1/725*    (2006.01)
*H04W 12/00*    (2009.01)
(Continued)

(52) U.S. Cl.
CPC ........... *H04M 1/72533* (2013.01); *G01S 5/18* (2013.01); *G01S 5/22* (2013.01); *G06F 3/167* (2013.01);
(Continued)

(58) Field of Classification Search
CPC ........ H04B 11/00; H04L 12/28; H04M 1/725; H04M 1/72533; H04Q 9/00; H04W 12/06; H04W 4/02; H04W 8/205; H04W 88/02
See application file for complete search history.

(56) References Cited

U.S. PATENT DOCUMENTS 6,906,612 B2    6/2005    Ghabra et al.
7,843,333 B2    11/2010   Angelhag et al.
(Continued)

FOREIGN PATENT DOCUMENTS

JP    2001-115706    4/2001
KR    1020030030729    4/2003
(Continued)

OTHER PUBLICATIONS

International Search Report dated Dec. 23, 2015 issued in counterpart application No. PCT/KR2015/009519, 21 pages.

*Primary Examiner* — Khawar Iqbal
(74) *Attorney, Agent, or Firm* — The Farrell Law Firm, P.C.

(57) ABSTRACT

A mobile device includes a communicator configured to transmit information about least one of a frequency, a pattern, and an amplitude to an electronic device located within a critical distance from the mobile device, an acoustic wave output interface configured to output an acoustic wave matching at least one of the frequency, the pattern, and the amplitude, and a controller configured to provide a user interface to operate a function of the electronic device when information about the function of the electronic device controllable by the mobile device is received through the communicator.

8 Claims, 14 Drawing Sheets

| ELECTRONIC DEVICE | REFRIGERATOR | WASHING MACHINE | TV | AIR CONDITIONER |
|---|---|---|---|---|
| FIRST LEVEL | ALL FUNCTIONS | ALL FUNCTIONS | ALL FUNCTIONS | ALL FUNCTIONS |
| SECOND LEVEL | DOOR OPENING/CLOSING, TEMPERATURE CONTROL, LIGHTING CONTROL | DOOR OPENING/CLOSING, WASHING FUNCTION | PARTIAL CHANNEL | COOLING OPERATION, TEMPERATURE CONTROL, OTHER FUNCTION |
| THIRD LEVEL | DOOR OPENING/CLOSING, WASHING FUNCTION | DOOR OPENING/CLOSING, WASHING FUNCTION | PARTIAL CHANNEL | COOLING OPERATION, TEMPERATURE CONTROL |
| FOURTH LEVEL | DOOR OPENING/CLOSING | DOOR OPENING/CLOSING | POWER ON/OFF | POWER ON/OFF |
| FIFTH LEVEL | UNCONTROLLABLE | UNCONTROLLABLE | UNCONTROLLABLE | UNCONTROLLABLE |

(51) Int. Cl.
  H04W 12/06       (2009.01)
  G06F 3/16        (2006.01)
  G01S 5/22        (2006.01)
  H04L 12/28       (2006.01)
  G01S 5/18        (2006.01)
  H04L 29/08           (2006.01)
  H04W 12/08           (2009.01)
  H04L 29/06           (2006.01)

(52) U.S. Cl.
  CPC ......... *H04L 12/282* (2013.01); *H04W 12/003* (2019.01); *H04W 12/06* (2013.01); *H04L 63/105* (2013.01); *H04L 63/107* (2013.01); *H04L 67/125* (2013.01); *H04L 2012/284* (2013.01); *H04L 2012/285* (2013.01); *H04W 12/00503* (2019.01); *H04W 12/00504* (2019.01); *H04W 12/08* (2013.01)

(56) References Cited

U.S. PATENT DOCUMENTS

| | | | | |
|---|---|---|---|---|
| 8,584,388 | B1* | 11/2013 | Fujisaki | F41A 17/08 |
| | | | | 42/70.01 |
| 9,789,904 | B2* | 10/2017 | Jecker | B62D 15/025 |
| 10,025,864 | B2* | 7/2018 | Chalouhi | G06Q 50/01 |
| 2012/0153868 | A1* | 6/2012 | Gu | H05B 37/0227 |
| | | | | 315/307 |
| 2013/0094356 | A1* | 4/2013 | Keith | H04L 47/2433 |
| | | | | 370/229 |
| 2014/0351870 | A1* | 11/2014 | Amine | H04N 21/2665 |
| | | | | 725/92 |
| 2015/0010167 | A1* | 1/2015 | Arling | H04N 21/42226 |
| | | | | 381/105 |
| 2015/0015385 | A1 | 1/2015 | Tomita et al. | |
| 2015/0020220 | A1* | 1/2015 | Mullick | H04L 63/0272 |
| | | | | 726/29 |
| 2015/0121434 | A1* | 4/2015 | Shimizu | H04N 21/42204 |
| | | | | 725/80 |
| 2015/0351204 | A1* | 12/2015 | Hershberg | H05B 37/0272 |
| | | | | 315/153 |
| 2015/0372954 | A1* | 12/2015 | Dubman | H04L 51/12 |
| | | | | 709/206 |
| 2016/0037332 | A1* | 2/2016 | Egeler | G08C 17/02 |
| | | | | 455/420 |
| 2016/0253855 | A1* | 9/2016 | Lowder | H04M 1/72533 |
| | | | | 455/420 |
| 2016/0277891 | A1* | 9/2016 | Dvortsov | H04W 4/023 |
| 2018/0074771 | A1* | 3/2018 | Cronin | G06F 3/14 |
| 2019/0096369 | A1* | 3/2019 | Takayama | G06Q 10/06 |

FOREIGN PATENT DOCUMENTS

| | | |
|---|---|---|
| KR | 1020090094167 | 9/2009 |
| KR | 1020110000997 | 1/2011 |
| KR | 1020110054814 | 5/2011 |
| KR | 1020130010717 | 1/2013 |
| KR | 1020140093556 | 7/2014 |
| WO | WO 2013/024922 | 2/2013 |

* cited by examiner

FIG. 6

| ELECTRONIC DEVICE | REFRIGERATOR | WASHING MACHINE | TV | AIR CONDITIONER |
|---|---|---|---|---|
| CRITICAL DISTANCE | 1 | 5 | 2 | 3 |

(UNIT : m)

FIG. 7A

| ELECTRONIC DEVICE | REFRIGERATOR | WASHING MACHINE | TV | AIR CONDITIONER |
|---|---|---|---|---|
| FIRST LEVEL | ALL FUNCTIONS | ALL FUNCTIONS | ALL FUNCTIONS | ALL FUNCTIONS |
| SECOND LEVEL | DOOR OPENING/CLOSING, TEMPERATURE CONTROL, LIGHTING CONTROL | DOOR OPENING/CLOSING, WASHING FUNCTION | PARTIAL CHANNEL | COOLING OPERATION, TEMPERATURE CONTROL, OTHER FUNCTION |
| THIRD LEVEL | DOOR OPENING/CLOSING, WASHING FUNCTION | DOOR OPENING/CLOSING, WASHING FUNCTION | PARTIAL CHANNEL | COOLING OPERATION, TEMPERATURE CONTROL |
| FOURTH LEVEL | DOOR OPENING /CLOSING | DOOR OPENING/CLOSING | POWER ON/OFF | POWER ON/OFF |
| FIFTH LEVEL | UNCONTROLLABLE | UNCONTROLLABLE | UNCONTROLLABLE | UNCONTROLLABLE |

FIG. 7B

| USER IDENTIFICATION INFORMATION | PERMISSION LEVEL |
|---|---|
| FIRST USER | FIRST LEVEL |
| SECOND USER | SECOND LEVEL |
| THIRD USER | THIRD LEVEL |

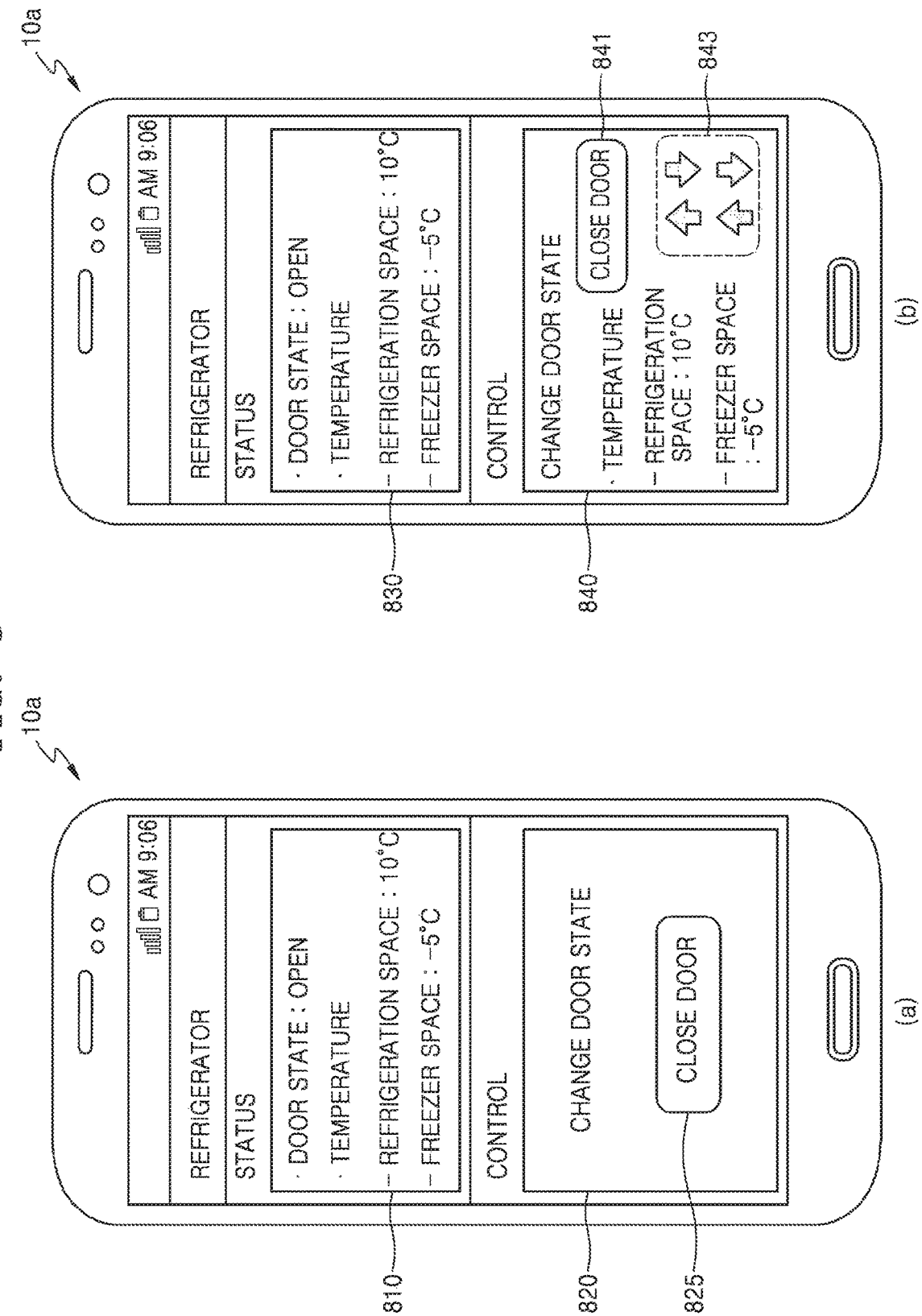

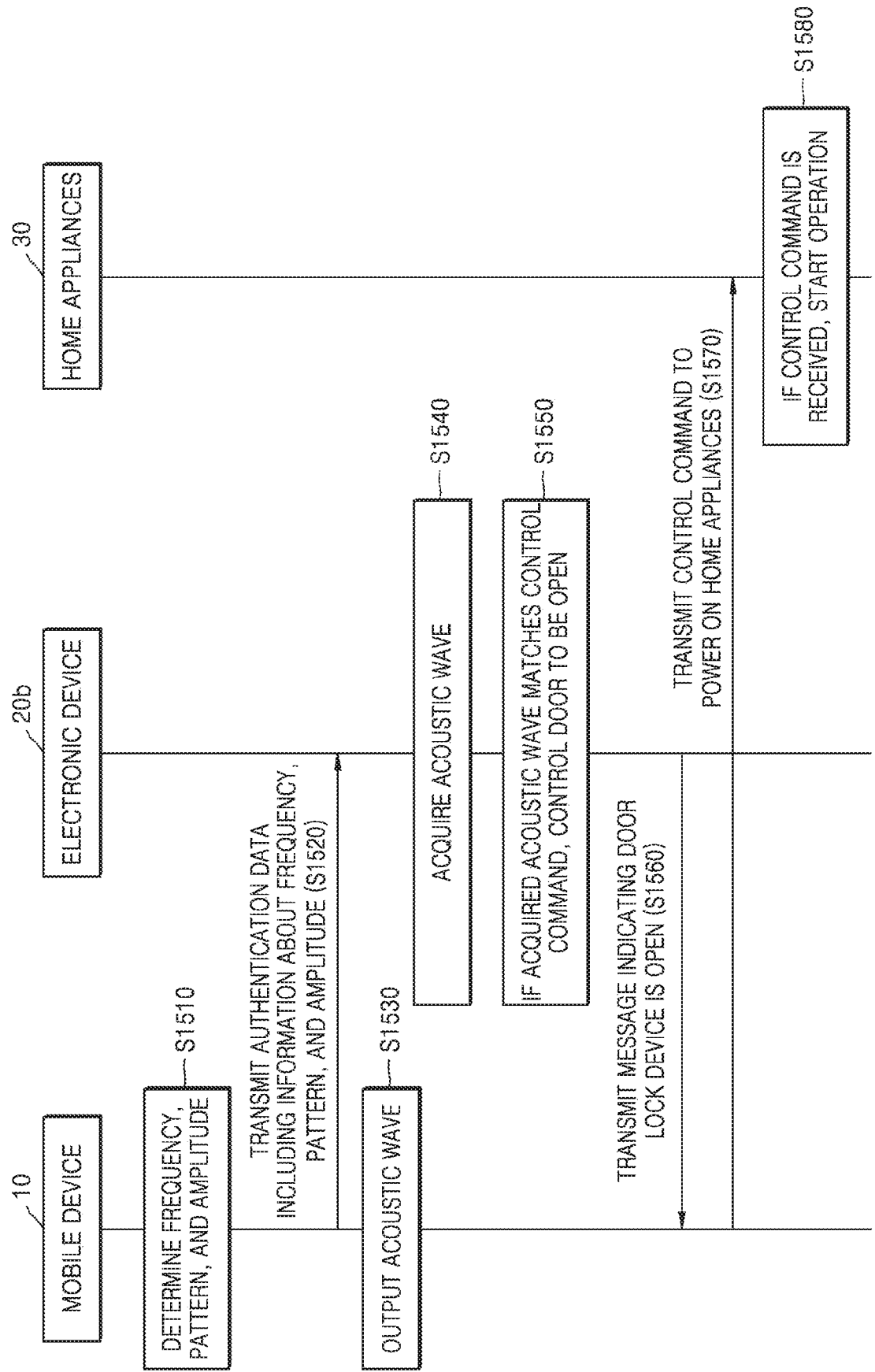

ELECTRONIC DEVICE CONTROL SYSTEM, AND METHOD FOR OPERATING ELECTRONIC DEVICE CONTROL SYSTEM

PRIORITY

This application is a National Phase Entry of PCT International Application No. PCT/KR2015/009519, which was filed on Sep. 10, 2015, and claims priority to Chinese Patent Application No. 201410488210.X, which was filed on Sep. 22, 2014, and Korean Patent Application No. 10-2015-0127714, which was filed on Sep. 9, 2015, the contents of each of which are incorporated herein by reference.

TECHNICAL FIELD

The present invention relates to an electronic device control system and a method for operating the electronic device control system. More particularly, the present invention relates to a mobile device constituting an electronic device controlling system, an electronic device, and a method of operating the mobile device and the electronic device.

BACKGROUND ART

Due to the development of network technologies and the spread of smartphones, technologies that enhance user convenience by linking various devices with smartphones are becoming popular.

Recently, a need has arisen for technologies allowing smartphone users to check and control the state of home appliances in the home via smartphones.

DETAILED DESCRIPTION OF THE INVENTIVE CONCEPT

Technical Problem

The present inventive concept provides a system and method for automatically controlling home appliances by using a mobile device.

Technical Solution

According to an aspect of the present inventive concept, there is provided a method and system for controlling an electronic device by using a mobile device. Furthermore, there is provided a non-transitory computer readable storage medium having stored thereon a program, which when executed by a computer, performs the above method.

DESCRIPTION OF THE DRAWINGS

FIG. 6 illustrates a critical distance for communication between a mobile device and an electronic device.

FIGS. 7A and 7B illustrate a method in which an electronic device determines a permission level based on user identification information stored in a mobile device.

FIG. 8 illustrates examples in which a mobile device provides a user interface.

FIG. 15 is a flowchart for explaining a method, according to an embodiment, in which an electronic device control system powers on home appliances.

BEST MODE

Figure 1:
FIG. 1 illustrates an example of an electronic device control system.

According to a first aspect of the present disclosure, there is provided a mobile device including a communicator configured to transmit information about least one of a frequency, a pattern, and an amplitude to an electronic device located within a critical distance from the mobile device, an acoustic wave output interface configured to output an acoustic wave matching at least one of the frequency, the pattern, and the amplitude, and a controller configured to provide a user interface to operate a function of the electronic device when information about the function of the electronic device controllable by the mobile device is received through the communicator.

The amplitude may be determined by at least one of an ambient noise level and a distance between the mobile device and the electronic device.

The information about the function of the electronic device may be determined by the electronic device according to a position of the mobile device.

The communicator may be further configured to transmit user identification information stored in the mobile device to the electronic device, and information about the function of the electronic device may be determined by the electronic device based on the user identification information.

The communicator may be further configured to transmit key information to the electronic device and receives from the electronic device an authentication completion message indicating that the mobile device is authenticated, by using the key information, and the acoustic wave output interface may be further configured to output the acoustic wave when the authentication completion message is received.

According to a second aspect of the present disclosure, there is provided an electronic device including a communicator configured to receive information about at least one of a frequency, a pattern, and an amplitude from a mobile device located within a critical distance from the electronic device, an acoustic wave acquiring device configured to acquire an acoustic wave, and a controller configured to provide information about a function of the electronic device controllable by the mobile device, to the mobile device, when the acquired acoustic wave matches at least one of the frequency and the pattern.

The acoustic wave acquiring device may include a plurality of acoustic wave acquiring devices, and the controller may be further configured to determine a position of the mobile device by comparing magnitudes of amplitudes of acoustic waves acquired by the plurality of acoustic wave acquiring devices.

The communicator may be further configured to receive user identification information stored in the mobile device, and the controller may be further configure to determine a permission level of the mobile device with respect to the functions of the electronic device based on the user identification information, extract information about one or more of the functions of the electronic device based on the permission level, and provide the extracted information to the mobile device.

The communicator may be further configure to receive key information from the mobile device, and the controller may be further configured to authenticate the mobile device by using the key information and, when the mobile device is authenticated, control the communicator to transmit an authentication completion message to the mobile device.

According to a third aspect of the present disclosure, there is provided a method of operating a mobile device, which includes transmitting information about least one of a frequency, a pattern, and an amplitude to an electronic device located within a critical distance from the mobile device, outputting an acoustic wave matching at least one of the frequency, the pattern and the amplitude, receiving information about a function of the electronic device controllable by the mobile device, and providing a user interface based on the received information and controlling the function of the electronic device is controllable via the user interface.

According to a fourth aspect of the present disclosure, there is provided a method of operating an electronic device, which includes receiving information about at least one of a frequency, a pattern, and an amplitude from a mobile device located within a critical distance from the electronic device, acquiring an acoustic wave, and when the acquired acoustic wave matches at least one of the frequency and the pattern, providing information about a function of the electronic device controllable by the mobile device, to the mobile device.

According to a fifth aspect of the present disclosure, there is provided a non-transitory computer readable storage medium having stored thereon a program, which when executed by a computer, performs the methods according to the third and fourth aspects of the present disclosure.

MODE OF THE INVENTIVE CONCEPT

The terms used in the present specification are briefly described and the present inventive concept is described in detail.

The terms used in the present inventive concept have been selected from currently widely used general terms in consideration of the functions in the present inventive concept. However, the terms may vary according to the intention of one of ordinary skill in the art, case precedents, and the advent of new technologies. Also, for special cases, meanings of the terms selected by the applicant are described in detail in the description section. Accordingly, the terms used in the present inventive concept are defined based on their meanings in relation to the contents discussed throughout the specification, not by their simple meanings.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present inventive concept, a first constituent element may be referred to as a second constituent element, and vice versa. The term "and/or" used herein may include a combination of a plurality of related items or any one of a plurality of related items.

When a part may "include" a certain constituent element, unless specified otherwise, it may not be construed to exclude another constituent element but may be construed to further include other constituent elements. Terms such as "~unit" stated in the specification may signify a unit to process at least one function or operation and the unit may be embodied by hardware such as a field-programmable gate array (FPGA) or an application-specific integrated circuit (ASIC), software, or a combination of hardware and software. However, the unit may be configured to be located in a storage medium to be addressed or configured to be able to operate one or more processors. Accordingly, the unit as an example includes constituent elements such as software constituent elements, object-oriented software constituent elements, class constituent elements, and task constituent elements, processes, functions, attributes, procedures, subroutines, segments of program codes, drivers, firmware, microcodes, circuits, data, databases, data structures, tables, arrays, and variables. The constituent elements and functions provided by the "units" may be combined into a smaller number of constituent elements and units or may be further divided into additional constituent elements and units. Accordingly, the present inventive concept is not limited by a specific combination of hardware and software.

The present inventive concept will now be described more fully with reference to the accompanying drawings, in which embodiments of the inventive concept are shown. The inventive concept may, however, be embodied in many different forms and should not be construed as being limited to the embodiments set forth herein. Like reference numerals in the drawings denote like elements, and thus their description will be omitted.

FIG. 1 illustrates an example of an electronic device control system. Referring to FIG. 1, the electronic device control system may include a mobile device 10 and an electronic device 20.

The mobile device 10 may determine whether a distance between the mobile device 10 and the electronic device 20 is within a critical distance, and transmit authentication data to the electronic device 20 to authenticate the mobile device 10 and the electronic device 20. For example, the authentication data may include information about at least one of a frequency, a pattern, and an amplitude of an acoustic wave. Furthermore, the authentication data may further include key information. The key information may include a key value preciously set between the mobile device 10 and the electronic device 20. In an embodiment, the mobile device 10 may encrypt the preset key value and transmit authentication data including an encrypted key value and/or an encryption algorithm to the electronic device 20.

Furthermore, the mobile device 10 may generate and output an acoustic wave matching a frequency, a pattern, and an amplitude matching those included in the authentication data.

The electronic device 20 may acquire the acoustic wave output by the mobile device 10. Furthermore, the electronic device 20 may compare the frequency and pattern of the acquired acoustic wave with the frequency and pattern of the authentication data acquired from the mobile device 10. When the frequency and pattern of the acquired acoustic wave match frequency and pattern of the authentication data according to the comparison, the electronic device 20 may provide the mobile device 10 with data including information about functions of the electronic device 20 controllable by the mobile device 10. Accordingly, the mobile device 10 may dynamically receive the information about the functions of the electronic device 20 controllable by the mobile device 10.

However, when the frequency and pattern of the acquired acoustic wave do not match the frequency and pattern of the authentication data, the electronic device 20 may request the mobile device 10 to output the acoustic wave again.

In this connection, the electronic device 20 may be a home appliance such as a refrigerator, a washing machine, a TV, an air conditioner, or lighting equipment. Accordingly, in the present embodiment, according to the electronic device control system and method, even when a home appliance is added, the added home appliance may be controlled by authenticating the mobile device 10 and using the authenticated mobile device 10, without separately setting the mobile device 10. However, the electronic device 20 is not limited to a home appliance, and the electronic device 20 may be an apparatus, such as a door lock device or a safe box device, requiring high security.

The mobile device 10 may be, for example, a mobile phone, a personal digital assistant (PDA), a laptop computer, a media player, a micro server, an electronic book terminal, a digital broadcasting terminal, a remote controller, a navigation device, an MP3 player, a digital camera, or another mobile device, but is not limited thereto. For example, the mobile device 10 may be clocks, glasses, hair bands, earphones, and rings with communication and data processing capabilities.

Figure 2:
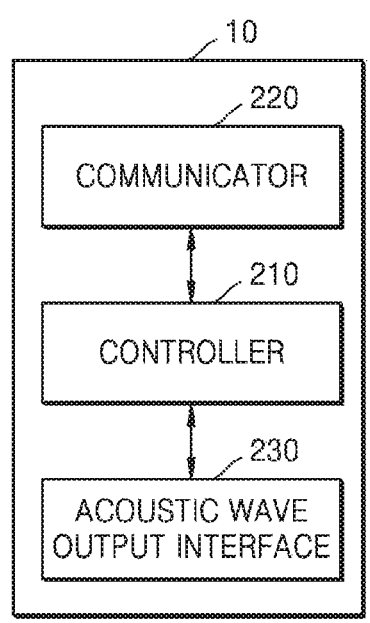
FIG. 2 is a block diagram showing a configuration of a mobile device according to an embodiment.

FIG. 2 is a block diagram showing a configuration of a mobile device according to an embodiment.

Referring to FIG. 2, the mobile device 10 may include a controller 210, a communicator 220, and an acoustic wave output interface 230. Furthermore, in some embodiments, the controller 210, the communicator 220, and the acoustic wave output interface 230 of the mobile device 10 may transceive data via a bus (not shown).

The controller 210 controls an overall operation of the mobile device 10. When a distance between the mobile device 10 and the electronic device 20 is within a critical distance, the controller 210 generates the authentication data including information about the frequency, pattern, and amplitude of an acoustic wave.

In this connection, the critical distance may be a communication coverage determined by a wireless communication technique, such as a Bluetooth communication coverage or a Wi-Fi communication coverage. Furthermore, a critical range may be a preset value. In this case, the controller 210 may determine whether the distance between the mobile device 10 and the electronic device 20 is within the critical distance, by comparing positional information of the mobile device 10 acquired through a global positioning system (GPS) chip (not shown) provided in the mobile device 10 with positional information of the electronic device 20 received from the electronic device 20. Furthermore, the critical range may be determined according to the properties or type of the electronic device 20. For example, the controller 210 may determine the critical distance by using information indicating device type of the electronic device 20 acquired when the mobile device 10 is paired with the electronic device 20.

In detail, when the distance from the mobile device 10 is within the critical distance, the controller 210 may determine the frequency, pattern, and amplitude of an acoustic wave. For example, the controller 210 may randomly set the frequency and pattern of an acoustic wave. Furthermore, the controller 210 may set the amplitude of the acoustic wave depending on ambient noise level measured around the mobile device 10. In this state, the mobile device 10 may acquire ambient sound, for example, an acoustic wave, through a microphone (not shown), and measure the sound level, e.g., decibels (dB), of the acquired ambient sound. Furthermore, the controller 210 may determine the amplitude of an acoustic wave by using a mathematical expression below.

$$dB=20*\log(p/p0) \quad \text{[Mathematical Expression 1]}$$

In the above mathematical expression, "p0" may denote a standard pressure, for example, about 20 micro-pascals. Furthermore, "p" may denote a pressure difference between the highest point and the lowest point of an acoustic wave. Accordingly, the controller 210 may determine the amplitude of an acoustic wave by using a p value calculated by substituting a measured DB level of the ambient sound in the mathematical expression. Furthermore, the controller 210 may determine the amplitude of an acoustic wave based on the distance between the mobile device 10 and the electronic device 20. For example, the controller 210 may decrease the amplitude of an acoustic wave as the distance between the mobile device 10 and the electronic device 20 decreases.

As such, the controller 210 may generate authentication data including information about at least one of the dynamically determined frequency, pattern, and amplitude. However, in some embodiments, the controller 210 may select a wave configuration previously stored in the mobile device 10, and generate control data for setting the frequency, pattern, and amplitude of an acoustic wave according to the selected wave configuration.

Furthermore, the controller 210 may generate an acoustic wave according to a preset acoustic wave generation algorithm, and generate authentication data including information about the frequency, pattern, and amplitude of the generated acoustic wave.

Furthermore, the controller 210 may generate an acoustic wave having the determined frequency, pattern, and amplitude.

In some embodiments, the controller 210 may generate authentication data including a key value. The key value may be set when the mobile device 10 and the electronic device 20 attempt to establish an initial communication. For example, when a user of the mobile device 10 installs and executes an application installed in the mobile device 10 for controlling the electronic device control system, the mobile device 10 tries to establish communication with the electronic device 20 and may set a key value, for example, a combination of numbers, letters, and symbols, therebetween.

Furthermore, the controller 210 may encrypt the key value and generate authentication data including the encrypted key value. For example, the controller 210 may encrypt a key value by using a preset encryption algorithm during the first communication work performed between the mobile device 10 and the electronic device 20.

When the authentication data includes a key value, the controller 210 may generate an acoustic wave having the determined frequency, pattern, and amplitude after a message indicating that authentication of the mobile device 10 is completed is received from the electronic device 20.

Furthermore, in some embodiments, the controller 210 may generate authentication data including user identification information stored in the mobile device 10. The user identification information may be, for example, the name, ID, nickname, or unique ID number of a user using the mobile device 10, and may include information about age, gender, or position of the user.

The communicator 220 may include one or more constituent elements which enable the mobile device 10 to communicate with the electronic device 20. For example, the communicator 220 may include a Wi-Fi chip, a Bluetooth chip, a wireless communication chip, a near field communication (NFC) chip, or a direct WIFI chip. The controller 210 may transceive data with the electronic device 20 by using the communicator 220.

For example, after completing a pairing operation with the electronic device 20 via a Bluetooth chip (not shown), the communicator 220 may notify the controller 210 that the electronic device 20 is located within a Bluetooth communication coverage. Furthermore, the communicator 220 may provide the controller 210 with information indicating device type of the electronic device 20 acquired when pairing to the electronic device 20 is performed.

Furthermore, the communicator 220 may request and/or receive information indicating device type of the electronic device 20 from the electronic device 20 connected to an access point via a Wi-Fi chip (not shown). Furthermore, the communicator 220 may request and/or receive positional information of the electronic device 20 connected to the access point.

Furthermore, the communicator 220 may initiate communication with the electronic device 20 and notify the controller 210 that the electronic device 20 is located within a communication coverage, via a direct Wi-Fi chip (not shown). However, the present disclosure is not limited thereto and the communicator 220 may initiate communication with the electronic device 20 via various wireless communication techniques.

Furthermore, the communicator 220 may transmit authentication data generated by the controller 210 to the electronic device 20. In some embodiments, when the authentication data further includes key information (or, encrypted key information), the communicator 220 may receive from the electronic device 20 an authentication completion message indicating that the mobile device 10 was authenticated by the electronic device 20.

The acoustic wave output interface 230 outputs an acoustic wave under the control of the controller 210. For example, the acoustic wave output interface 230 may output the acoustic wave generated by the controller 210. The acoustic wave output interface 230 may include, for example, a speaker for outputting the acoustic wave to the outside.

Next, the communicator 220 may receive data including information about functions of the electronic device 20 are controllable by the mobile device 10. The information about the functions of electronic device 20 may include format information or information about an operation code OPCODE for each function of a control command which is performable by the electronic device 20. For example, when the electronic device 20 is a refrigerator, the communicator 220 may receive control data format information of the electronic device 20 and OPCODE information about a door opening/closing function of the refrigerator, or a temperature control function of a freezer space and a refrigeration space.

In some embodiments, the mobile device 10 may receive information about the functions of the electronic device 20 determined according to a permission level of the mobile device 10, based on the user identification information stored in the mobile device 10.

The controller 210 may provide a user interface for controlling the functions of the electronic device 20 based on the received data. For example, the controller 210 may provide a graphic user interface (GUI) for controlling the functions of the electronic device 20, to a screen of the mobile device 10. Furthermore, the controller 210 may output voice prompts for controlling the functions of the electronic device 20, through the acoustic wave output interface 230.

When the mobile device 10 receives a user input about the user interface, for example, a touch input or a voice input, the controller 210 may transmit a control command to the electronic device 20 via the communicator 220. Accordingly, the mobile device 10 may control a function of the electronic device 20.

In some embodiments, the communicator 220 may further receive information about a current state of the electronic device 20. In this case, the controller 210 may provide a user interface showing information about the current state of the electronic device 20. Furthermore, the controller 210 may provide the information about the current state of the electronic device 20 via the guide voice through the acoustic wave output interface 230.

Furthermore, the communicator 220 may receive a message to output an acoustic wave again. In this case, the controller 210 may control the acoustic wave output interface 230 to output an acoustic wave again.

Figure 3:
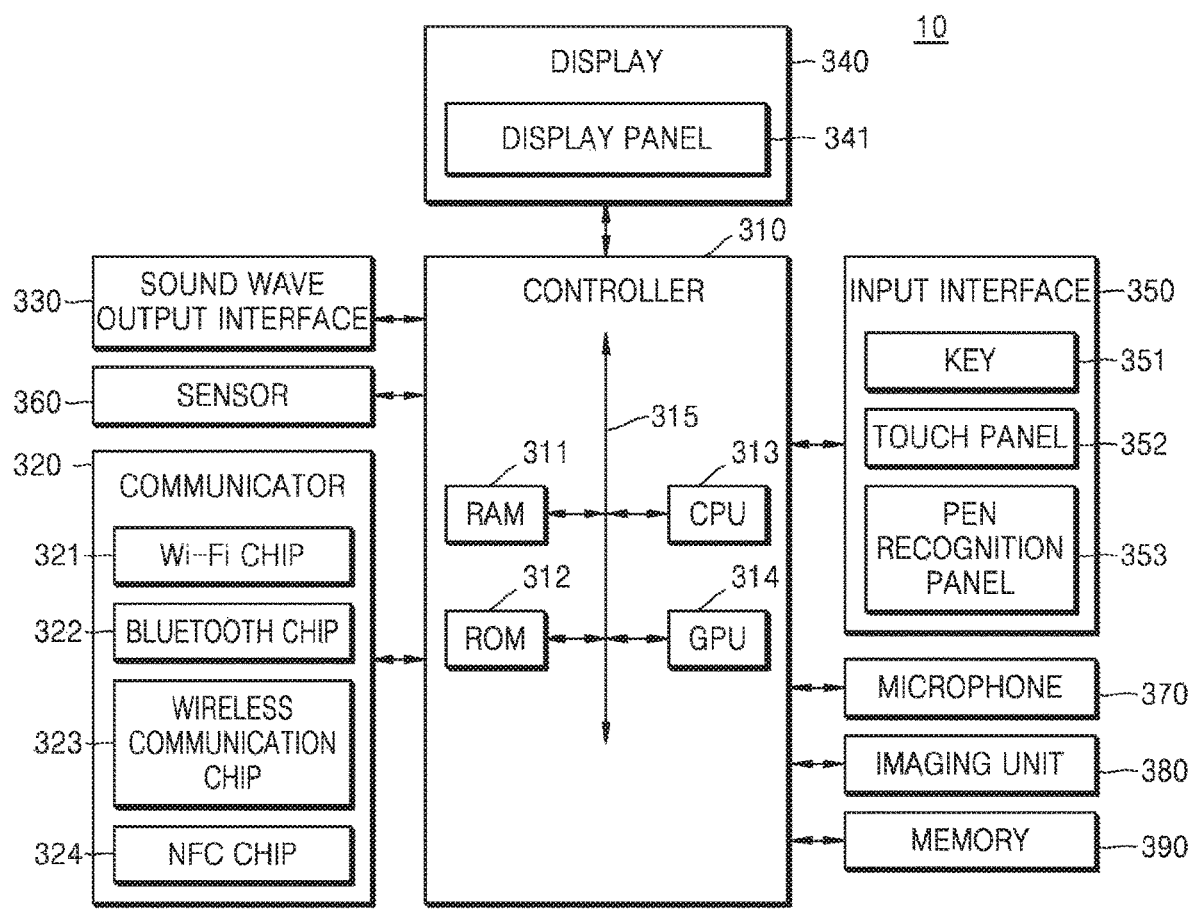
FIG. 3 is a block diagram showing a detailed configuration of a mobile device according to an embodiment.

FIG. 3 is a block diagram showing a detailed configuration of a mobile device according to an embodiment. Referring to FIG. 3, the mobile device 10 may further include a display 340, an input interface 350, a sensor 360, a microphone 370, an imaging unit 380, and a memory 390, in addition to a controller 310, a communicator 320, and an acoustic wave output interface 330 which includes components corresponding to the controller 210, the communicator 220, and the acoustic wave output interface 230 of FIG. 2.

The controller 310 may include at least one of random access memory (RAM) 311, read-only memory (ROM) 312, a central processing unit (CPU) 313, a graphic processing unit (GPU) 314, and a bus 315. The RAM 311, the ROM 312, the CPU 313, and the GPU 314 may be connected to one another via the bus 315.

The CPU 313 accesses the memory 390 and executes a boot operation by using an operating system (OS) stored in the memory 390. Then, the CPU 313 performs various operations by using various programs, content, or data stored in the memory 390.

The ROM 312 stores a command set for system booting. For example, when a power-on command is input and thus power is supplied to the mobile device 10, the CPU 313 may copy the OS stored in the memory 390 according to the command stored in the ROM 312, and execute the OS to boot the system. When the boot is complete, the CPU 313 copies various programs stored in the memory 390 to the RAM 311 and executes the programs copied to the RAM 311 to perform various operations. For example, the CPU 313 may execute an application capable of controlling a door lock system. When the mobile device 10 has completed the boot operation, the GPU 314 displays a UI image in an area of the display 340. Furthermore, an image generated by the GPU 314 is provided to the display 340 and displayed in respective areas of the display 340.

Furthermore, since the controller 310 corresponds to the controller 210 of FIG. 2, a detailed description thereof is omitted.

The communicator 320 may include at least one of a Wi-Fi chip 321, a Bluetooth chip 322, a wireless communication chip 323, and a NFC chip 324. The controller 310 may transceive data with the electronic device 20 through the communicator 320.

The Wi-Fi chip 321 and the Bluetooth chip 322 may perform communication respectively by a Wi-Fi method and a Bluetooth method. When the Wi-Fi chip 321 or the Bluetooth chip 322 is used, a pairing operation of first transceiving various pieces of connection information such as a service set identifier (SSID) and a session key is performed to establish a communication connection and then transceive various pieces of information.

The wireless communication chip 323 denotes a chip that performs communication according to various communication protocols such as IEEE, Zigbee, the 3rd Generation (3G), the 3rd Generation Partnership Project (3GPP), or Long Term Evolution (LTE). The NFC chip 324 denotes a chip that operates in the NFC method using a 13.56 MHz range among various RF-ID frequency ranges such as 135 kHz, 13.56 MHz, 433 MHz, 860 to 960 MHz, or 2.45 GHz.

Furthermore, since the communicator 320 corresponds to the communicator 220 of FIG. 2, a detailed description thereof is omitted.

The acoustic wave output interface 330 corresponds to the acoustic wave output interface 230 of FIG. 2, and may output audio data including an acoustic wave under the control of the controller 310.

The display 340 may display information processed by the mobile device 10, under the control of the controller 310. For example, the display 340 may display a message indicating that the electronic device 20 authenticates the mobile device 10. Furthermore, the display 340 may display a user interface for controlling the functions of the electronic device 20, based on the functions of the electronic device 20 received from the electronic device 20. For example, the display 340 may display the GUI for receiving a user input to control the functions of the electronic device 20. Furthermore, the display 340 may display information about a current state of the electronic device 20.

The display 340 may include a display panel 341 and a controller (not shown) for controlling the display panel 341. The display panel 341 may be implemented as any of various types of displays such as a liquid crystal display (LCD), an organic light-emitting diode (OLED) display, an active-matrix organic light-emitting diode (AM-OLED), or a plasma display panel (PDP). The display panel 341 may be implemented to be flexible, transparent, and wearable. The display 340 may be provided as a touch screen (not shown) by being coupled to a touch panel 352 of the input interface 350. For example, the touch screen may include an integrated module in which the display panel 341 and the touch panel 352 are combined in a stacked structure. Furthermore, the touch screen may further include a pressure sensitive sensor in a part of the integrated module in which the display panel 341 and the touch panel 352 are combined in a stacked structure.

The input interface 350 may receive various command inputs from a user. The input interface 350 may include at least one of a key 351, the touch panel 352, and a pen recognition panel 353.

The touch panel 352 may sense a user's touch input and output a touch event value corresponding to a sensed touch signal. For example, the touch panel 352 may receive a touch input including at least one of user's tab, touch and hold, double tap, drag, panning, flick, and drag and drop. When the touch panel 352 is coupled to the display panel 341, thus forming the touch screen, the touch screen may be implemented in various types of touch sensors such as capacitive type, pressure sensitive type, or piezoelectric type.

The capacitive type is a method of calculating a touch coordinate by sensing fine electricity caused in a user's body when a part of the user's body touches a surface of the touch screen, by using a dielectric coating on the surface of the touch screen. The pressure sensitive type is a method of calculating a touch coordinate by sensing a flow of current as upper and lower electrode plates at a touch point contact each other when the user touches the touch screen including two electrode plates. Although a touch event generated in the touch screen may be mainly generated by a human finger, the touch event may be generated by a conductive material capable of causing a capacitance change.

The key 351 may include various types of keys, such as mechanical buttons or wheels, formed in various areas including a front portion, a side portion, or a rear portion of an external surface of a main body of the mobile device 10.

The pen recognition panel 353 may sense a proximity input or touch input of a pen according to the use of a user's touch pen, for example, a stylus pen or a digitizer pen, and output a sensed pen proximity event or pen touch event. The pen recognition panel 353 may be implemented by, for example, an electromagnetic resonance (EMR) method, and may sense a touch or a proximity input according to a change in the intensity of an electromagnetic field due to the proximity or touch of a pen. In detail, the pen recognition panel 353 may be configured by including an electromagnetic induction coil sensor (not shown) having a grid structure and an electronic signal processing unit (not shown) sequentially providing an alternating current (AC) signal having a certain frequency to each of loop coils of the electromagnetic induction coil sensor. When a pen including a resonance circuit is present around the loop coils of the pen recognition panel 353, a magnetic field transmitted from a corresponding loop coil generates a current based on mutual electromagnetic induction in the resonance circuit in the pen. An induction magnetic field is generated from a coil forming the resonance circuit in the pen, based on the current, and the pen recognition panel 353 senses the induction magnetic field from the loop coil in a signal receiving state so that a proximity position or touch position of the pen may be sensed. The pen recognition panel 353 may be provided under the display panel 341 and may be large enough to cover, for example, a display area of the display panel 341.

The microphone 370 may receive a user voice input or other sound input and convert the received voice or sound to control data. For example, the microphone 370 may receive a user voice input corresponding commands displayed on or accessible via the user interface provided to control the electronic device 20. The controller 310 may generate the control data by using the user voice input through the microphone 370 and provide generated control data to the electronic device 20.

The imaging unit 380 may capture a still image or a moving picture according to the control of a user. The imaging unit 380 may be implemented in a plurality of units such as front cameras or rear cameras. When the imaging unit 380 and the microphone 370 are provided, the controller 310 may perform a control operation according to the user voice input through the microphone 370 or a user motion recognized by the imaging unit 380.

The memory 390 may include at least one of internal memory (not shown) and external memory (not shown).

The internal memory may include at least one of, for example, volatile memory including Dynamic RAM (DRAM), Static RAM (SRAM), or Synchronous Dynamic RAM (SDRAM), non-volatile memory including One Time Programmable ROM (OTPROM), Programmable ROM (PROM), Erasable and Programmable ROM (EPROM), Electrically Erasable and Programmable ROM (EEPROM), Mask ROM, or Flash ROM, Hard Disk Drives (HDDs), and Solid State Drives (SSDs).

The external memory may include at least one of, for example, a CompactFlash (CF) card, a Secure Digital (SD) card, a Micro-Secure Digital (Micro-SD) card, a Mini Secure Digital (mini-SD) card, an Extreme Digital (xD) card, and Memory Stick.

The memory 390 may store various programs and data used for the operation of the mobile device 10. For example, the memory 390 may temporarily or semi-permanently store functions for determining the frequency, pattern, and amplitude of an acoustic wave, an encryption algorithm for encrypting a key value, or a generated acoustic wave.

In addition, although not shown in FIG. 3, in some embodiments, the mobile device 10 may further include a universal serial bus (USB) port for connecting a USB connector, various external input ports for connecting various external terminals such as a headset, a mouse, or a LAN, a Digital Multimedia Broadcasting (DMB) chip for receiving and processing a DMB signal, or various sensors. Furthermore, the names of the above-described constituent elements of the mobile device 10 may be changed in some embodiments.

Figure 4:
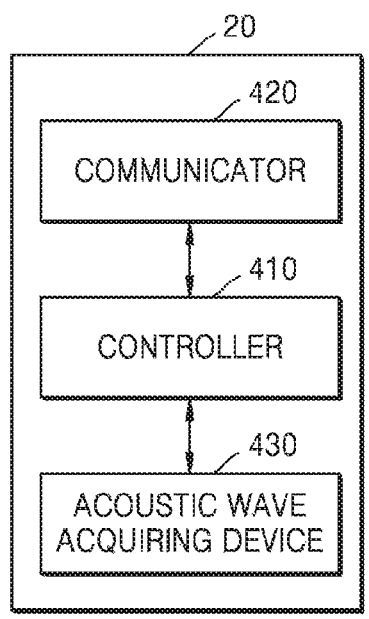
FIG. 4 is a block diagram showing a configuration of an electronic device according to an embodiment.

FIG. 4 is a block diagram showing a configuration of the electronic device 20 according to an embodiment.

Referring to FIG. 4, the electronic device 20 may include a controller 410, a communicator 420, and an acoustic wave acquiring device 430. Furthermore, in some embodiments, the controller 410, the communicator 420, and the acoustic wave acquiring device 430 of the electronic device 20 may transceive data through a bus (not shown).

The controller 410 controls an overall operation of the electronic device 20. For example, the controller 410 may control the communicator 420, or the acoustic wave acquiring device 430.

The controller 410 may acquire authentication data received from the mobile device 10 located within a critical distance from the electronic device 20, via the communicator 420. The authentication data may include information about at least one of the frequency, pattern, and amplitude of an acoustic wave. Furthermore, when receiving authentication data including information about an acoustic wave, the controller 410 may control the acoustic wave acquiring device 430 to start an operation.

In some embodiments, when the authentication data includes key information (key value), the controller 410 may authenticate the mobile device 10 by using the key information. For example, the controller 410 may verify the key value by using a preset authentication algorithm. If an authentication result is positive, the controller 410 may control the communicator 420 to transmit an authentication completion message indicating that the mobile device 10 is authenticated to the mobile device 10. If the authentication result is negative, the controller 410 may control the communicator 420 to transmit a message indicating that the mobile device 10 is not authenticated, to the mobile device 10.

The controller 410 may acquire acoustic wave or audio data acquired through the acoustic wave acquiring device 430. When the acquired acoustic wave matches the first acquired authentication data, the controller 410 may provide information about the functions of the electronic device 20 controllable by the mobile device 10 to the mobile device 10.

In detail, to determine whether the acquired acoustic wave matches the authentication data, the controller 410 may determine whether the frequency and pattern of the acquired acoustic wave matches information about the frequency and information about the pattern, included in the authentication data. In this state, the above matching may include not only a case in which the frequency and pattern of the acquired acoustic wave are the same as the frequency and pattern specified in the control command, but also a case of being within a certain error range, for example, an error range of about ±5%.

Furthermore, when the controller 410 determines the analyzed frequency and pattern match the information about the frequency and the information about the pattern included in the authentication data, the controller 410 may provide the mobile device 10 with information about which functions of the electronic device 20 are controllable by the mobile device 10. The information about the functions provided to the mobile device 10 may include the format information of the control command and OPCODE for each function, which are recognizable by the controller 410 of the electronic device 20.

In some embodiments, when the controller 410 determines the analyzed frequency and pattern match the information about the frequency and the information about the pattern included in the authentication data, the controller 410 may acquire information about a relative position of the mobile device 10. For example, the controller 410 may determine a relative position of the mobile device 10 with respect to the electronic device 20, for example, with respect to the side surface or the front surface of the electronic device 20 or the inside or outside of a door when the electronic device 20 includes the door, by comparing amplitudes of acoustic waves acquired by the acoustic wave acquiring device 430 including a plurality of acoustic wave acquiring devices. The operation that the electronic device 20 determines the position of the mobile device 10 is described in detail with reference to FIGS. 5A and 5B.

The controller 410 may extract information about the functions which are controllable by the mobile device 10 from among the functions of the electronic device 20 based on the position of the mobile device 10, and provide the extracted information to the mobile device 10 through the communicator 420.

For example, in a case in which the electronic device 20 is a refrigerator, when the mobile device 10 is located inside the door of the refrigerator, the controller 410 may provide information about a temperature control function of a freezer space and a refrigeration space, or information about a lighting control function of a freezer space and a refrigerator, and further provide a door opening/shutting function when the mobile device 10 is located outside the door. Furthermore, when the electronic device 20 is a TV, the controller 410 may provide information about an on/off function, a channel change function, or a volume change function of the TV when the mobile device 10 is located in front of or pointed toward the front surface of the TV, and only information about the on/off function of the TV when the mobile device 10 is located in front of or pointed toward the side surface or the rear surface of the TV.

In some embodiments, when the authentication data received from the mobile device 10 includes the user identification information stored in the mobile device 10, the controller 410 may determine the permission level of the mobile device 10 based on the user identification information. The permission level of the mobile device 10 may be a value indicating which functions of the electronic device 20 are controllable by the mobile device 10. For example, as the permission level decreases, the functions of the electronic device 20 controllable by the mobile device 10 may be further restricted. Furthermore, the permission level may be preset to the electronic device 20 for each user of the mobile device 10. Furthermore, the controller 410 may provide a user interface to set the permission level for each user identification information stored in the mobile device 10.

The communicator 420 may include one or more constituent elements which enable communication between the electronic device 20 and the mobile device 10. For example, the communicator 420 may include a Wi-Fi chip, a Bluetooth chip, or an NFC chip. The controller 410 may transceive data with the mobile device 10 by using the communicator 420.

The communicator 420 may pair the mobile device 10 and the electronic device 20 through a Wi-Fi chip (not shown), or a Bluetooth chip (not shown). Then, the communicator 420 may receive the authentication data from the mobile device 10. Furthermore, when the authentication data includes key information, the communicator 420 may transmit an authentication completion message indicating that the mobile device 10 is authenticated, a message indicating that the mobile device 10 is not authenticated, or a message to output an acoustic wave again to the mobile device 10.

The acoustic wave acquiring device 430 may acquire an acoustic wave from the outside. For example, the acoustic wave acquiring device 430 may receive an input of external sound and convert the received sound to audio data. The acoustic wave acquiring device 430 may provide the audio data to the controller 410. The controller 410 may analyze the audio data and find the frequency and pattern of an acquired acoustic wave.

Furthermore, the acoustic wave acquiring device 430 may include a plurality of acoustic wave acquiring devices, for example, microphones, and the acoustic wave acquiring devices may be arranged spaced apart from each other within the electronic device 20. Accordingly, the controller 410 may determine a relative position of the mobile device 10 with respect to the electronic device 20 by comparing the amplitudes of the acoustic waves acquired by the acoustic wave acquiring devices.

Furthermore, it will be easily understood by those of ordinary skill in the art of the disclosed invention that the electronic device 20 may further include various constituent elements, for example, coolers or motors, to perform various functions according to the properties of the electronic device 20.

Figure 5A:
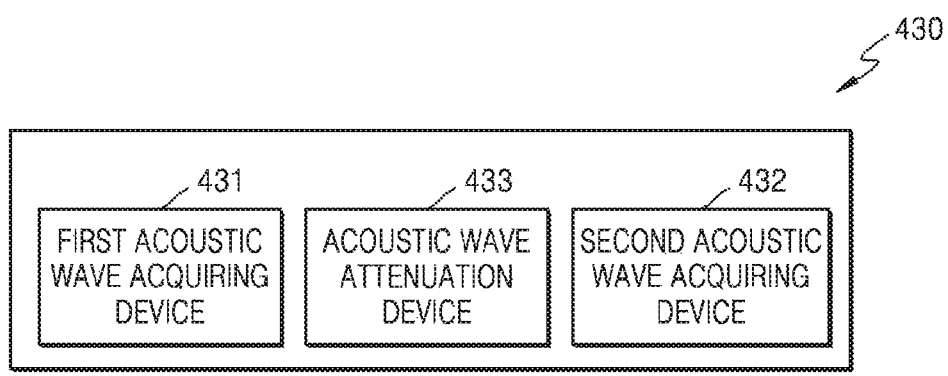
FIG. 5A is a block diagram showing in detail an acoustic wave acquiring device of an electronic device according to an embodiment.

FIG. 5A is a block diagram showing in detail an acoustic wave acquiring device 430 of the electronic device 20, according to an embodiment. Referring to FIG. 5A, the acoustic wave acquiring device 430 may include a first acoustic wave acquiring device 431, a second acoustic wave acquiring device 432, and an acoustic wave attenuation device 433.

The first acoustic wave acquiring device 431 and the second acoustic wave acquiring device 432 may be arranged spaced apart from each other in the electronic device 20. For example, the first acoustic wave acquiring device 431 may be arranged on the front surface of the electronic device 20, and the second acoustic wave acquiring device 432 may be arranged on the side surface of the electronic device 20.

The controller 410 of the electronic device 20 may determine whether the mobile device 10 is located at the front surface or the side surface of the electronic device 20 by comparing the amplitudes of the acoustic waves acquired by the first acoustic wave acquiring device 431 and the second acoustic wave acquiring device 432. In detail, when the amplitude of the acoustic wave acquired by the first acoustic wave acquiring device 431 is greater than the amplitude of the acoustic wave acquired by the second acoustic wave acquiring device 432, the controller 410 determines that the mobile device 10 is located at the front surface of a door 520 of the electronic device 20. In the opposite case, the controller 410 determines that the mobile device 10 is located at the side surface of the electronic device 20.

When the acquired acoustic wave matches the authentication data received from the mobile device 10, the controller 410 may provide the mobile device 10 with information to control the functions of the electronic device 20. The controller 410 may vary which functions to include in the information according to the location of the mobile device 10, for example, according to whether the mobile device 10 is located at the front surface or side surface of the electronic device 20. For example, when the electronic device 20 requires security as in the door lock device, the electronic device 20 controls the door lock device such that the door lock device does not open merely according to the position of the mobile device 10, thereby improving security.

The acoustic wave attenuation device 433 is located between the first acoustic wave acquiring device 431 and the second acoustic wave acquiring device 432, and may increase a difference in the amplitude between the acoustic wave acquired by the first acoustic wave acquiring device 431 and the acoustic wave acquired by the second acoustic wave acquiring device 432. In some embodiments, it will be easily understood by those of ordinary skill in the art of the disclosed invention that the acoustic wave attenuation device 433 may be omitted.

Figure 5B:
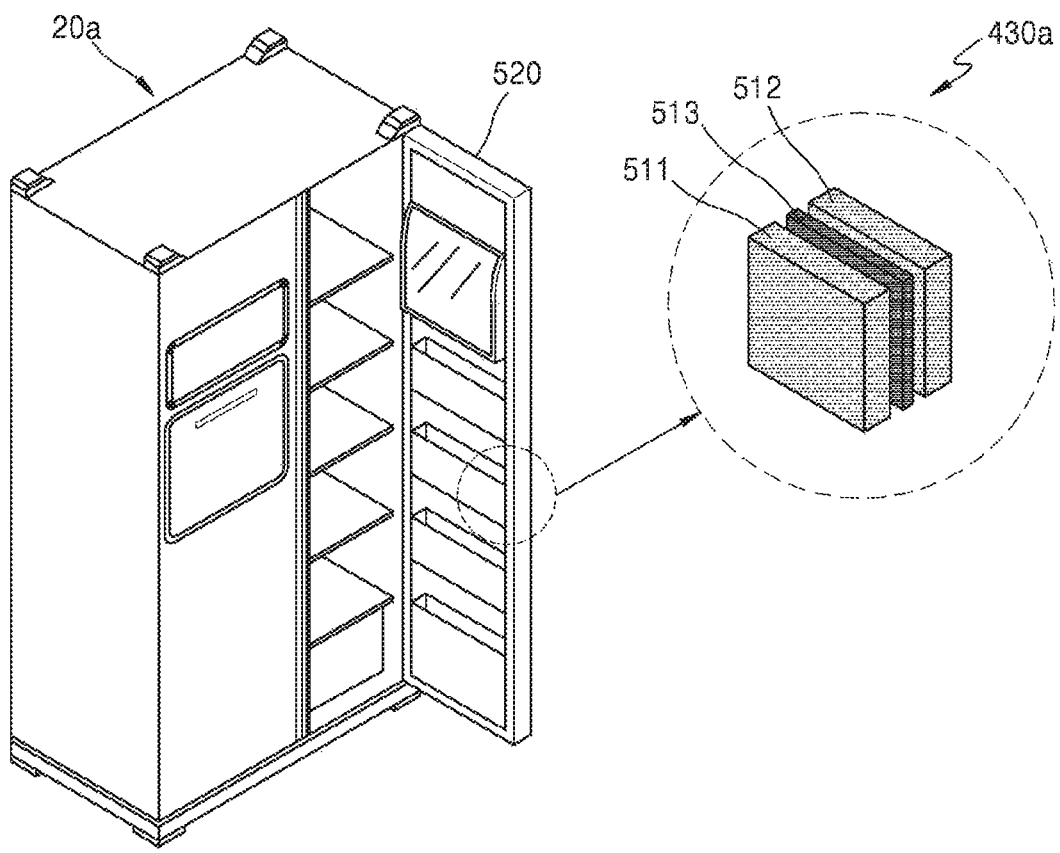
FIG. 5B illustrates an example of arrangement of an acoustic wave acquiring device of an electronic device.

FIG. 5B illustrates an example of arrangement of an acoustic wave acquiring device 430a of the electronic device 20. As illustrated in FIG. 5B, the acoustic wave acquiring device 430a corresponding to the acoustic wave acquiring device 430 of FIG. 4 may be arranged on door 520 of the electronic device 20a. Furthermore, the acoustic wave acquiring device 430a may include a first acoustic wave acquiring device 511 and a second acoustic wave acquiring device 512. The first acoustic wave acquiring device 511 may be arranged relatively further from the outside surface the door 520, and the second acoustic wave acquiring device 512 may be arranged relatively closer to the outside of the door 520. In this state, the first and second acoustic wave acquiring devices 511 and 512 may be integrated with an external wall of the door 520, and the first and second acoustic wave acquiring devices 511 and 512 may be implemented by microphones.

Furthermore, an acoustic wave attenuation block 513 for attenuating acoustic wave crosstalk between microphones may be arranged between the first acoustic wave acquiring device 511 and the second acoustic wave acquiring device 512.

The controller 410 of the electronic device 20 may determine whether the mobile device 10 is located on the inside or outside of the door 520, by comparing the magnitudes of the amplitudes of the acoustic waves acquired by the first acoustic wave acquiring device 511 and the second acoustic wave acquiring device 512.

FIG. 6 illustrates a critical distance for communication between the mobile device 10 and the electronic device 20.

As illustrated in FIG. 6, the mobile device 10 and the electronic device 20 may transceive data within a different critical distance according to the properties of the electronic device 20, for example, according to the type of the electronic device 20. This may be a value preset to the mobile device 10 according to the properties of the electronic device 20 and may be set by a user of the mobile device 10.

For example, when located within 5 m from a washing machine, the mobile device 10 may generate authentication data including information about an acoustic wave. When located within 1 m from a refrigerator, the mobile device 10 may generate authentication data. This is because a user may not need to control a refrigerator when past a certain distance, but still need to control a washing machine when past a certain distance.

Furthermore, in some embodiments, the mobile device 10 may interrupt the communication with the electronic device 20 when the distance between the mobile device 10 and the electronic device 20 is below a certain distance.

The mobile device 10 may interrupt communication when the distance between the mobile device 10 and the electronic device 20 is greater than a critical distance, and provide a message indicating that the communication with the electronic device 20 is interrupted, to a screen of the mobile device 10.

FIGS. 7A and 7B illustrate a method in which the electronic device 20 determines a permission level based on the user identification information stored in the mobile device 10.

Referring to FIG. 7A, the communicator 420 of the electronic device 20 may receive authentication data including information about an acoustic wave and the user identification information. In this case, the controller 410 of the electronic device 20 may determine the permission level of the mobile device 10 based on the user identification information. The electronic device 20 may be a home appliance, for example, a refrigerator, a washing machine, a TV, an air conditioner, or an illumination apparatus. Furthermore, the controller 410 of the electronic device 20 may set information about functions controllable by the mobile device 10 according to permission level, based on device type of the electronic device 20. For example, the electronic device 20 may be a refrigerator, and the mobile device 10 may be restricted from controlling the electronic device 20 when the mobile device 10 has a low permission level, that is, a fifth level, and the mobile device 10 may be granted control of all functions of the electronic device 20, for example, a door opening/closing function, a temperature control function, a lighting control function, or an automatic cleaning function, when the mobile device 10 has a high permission level, that is, a first level.

Furthermore, the controller 410 of the electronic device 20 may provide a user interface for a user to set information about functions controllable by the mobile device 10 for each permission level.

Furthermore, as illustrated in FIG. 7B, the controller 410 of the electronic device 20 may set a permission level for user identification information of each user of the mobile device 10. In this state, the user identification information may be a value obtained by combining at least one of a letter, a number, and a symbol preset to the mobile device 10 and the electronic device 20.

When the user identification information stored in the mobile device 10 is received through the communicator 420, the controller 410 of the electronic device 20 may search for a permission level corresponding to the received user identification information. Furthermore, the electronic device 20 may provide the mobile device 10 with the information about the functions of the electronic device 20 determined according to a found permission level.

For example, when the electronic device 20 is a refrigerator and "second user" identification information is received from the mobile device 10, the electronic device 20 may provide the mobile device 10 with OPCODE information about a door opening/closing function, a temperature control function, and a lighting control function, or control data format information. Furthermore, when the electronic device 20 is an air conditioner and the "second user" identification information is received from the mobile device 10, the electronic device 20 may provide the mobile device 10 with OPCODE information about a cooling operation function, a temperature control function, and another function such as a humidification function or a blowing function, or control data format information.

Furthermore, the user identification information may be information about age, gender, or position of a user of the mobile device 10. In this case, when the user identification information stored in the mobile device 10 is received, the controller 410 of the electronic device 20 may determine a permission level based on the user identification information. For example, when the information about the age of a user of the mobile device 10 is under 18, the permission level may be set to be a third level.

The user identification information stored in the mobile device 10 may be a value preset to the mobile device 10. Furthermore, the user identification information stored in the mobile device 10 may be a value input by the user of the mobile device 10 as a certain application capable of controlling the electronic device control system is executed in the mobile device 10.

FIG. 8 illustrates examples in which a mobile device 10*a* provides a user interface.

Referring to examples (a) and (b) of FIG. 8, the controller 310 of the mobile device 10*a* may provide current state information 810 and 830 and user interfaces 820 and 840 of the electronic device 20 received from the electronic device 20. In FIG. 8, it is assumed that the mobile device 10*a* is a mobile phone and the electronic device 20*a* transceiving a control command with the mobile device 10*a* is a refrigerator.

In detail, the controller 310 of the mobile device 10*a* may control the display 340 to display on a screen the current state information 810 and 830 of the electronic device 20 and GUIs 825, 841, and 843 for receiving a user input to control the functions of the electronic device 20 controllable by the mobile device 10*a*.

The example (a) of FIG. 8 illustrates that the permission level of the mobile device 10*a* with respect to the electronic device 20*a* is a fourth level, whereas the example (b) of FIG. 8 illustrates that the permission level of the mobile device 10*a* with respect to the electronic device 20*a* is the third level. As illustrated in FIG. 8, although in the example (a) of FIG. 8 the user of the mobile device 10a may change only a door state of the electronic device 20a via the mobile device 10a, the user of the mobile device 10a of the example (b) of FIG. 8 may change not only the door state of the electronic device 20a but also the temperatures of the refrigeration space and the freezer space.

As such, the mobile device 10a may provide different user interfaces according to the permission level.

FIGS. 9 to 13 are views for explaining methods of operating the electronic device control system according to embodiments. In the following description, methods of operating the electronic device control system according to the above-described embodiments with reference to FIGS. 1 to 8 are described with FIGS. 9 to 13. Unless otherwise mentioned, the above-described contents and technical concepts are identically applied to the methods of FIGS. 9 to 13. Accordingly, redundant descriptions from FIGS. 1 to 8 are omitted.

Figure 9:
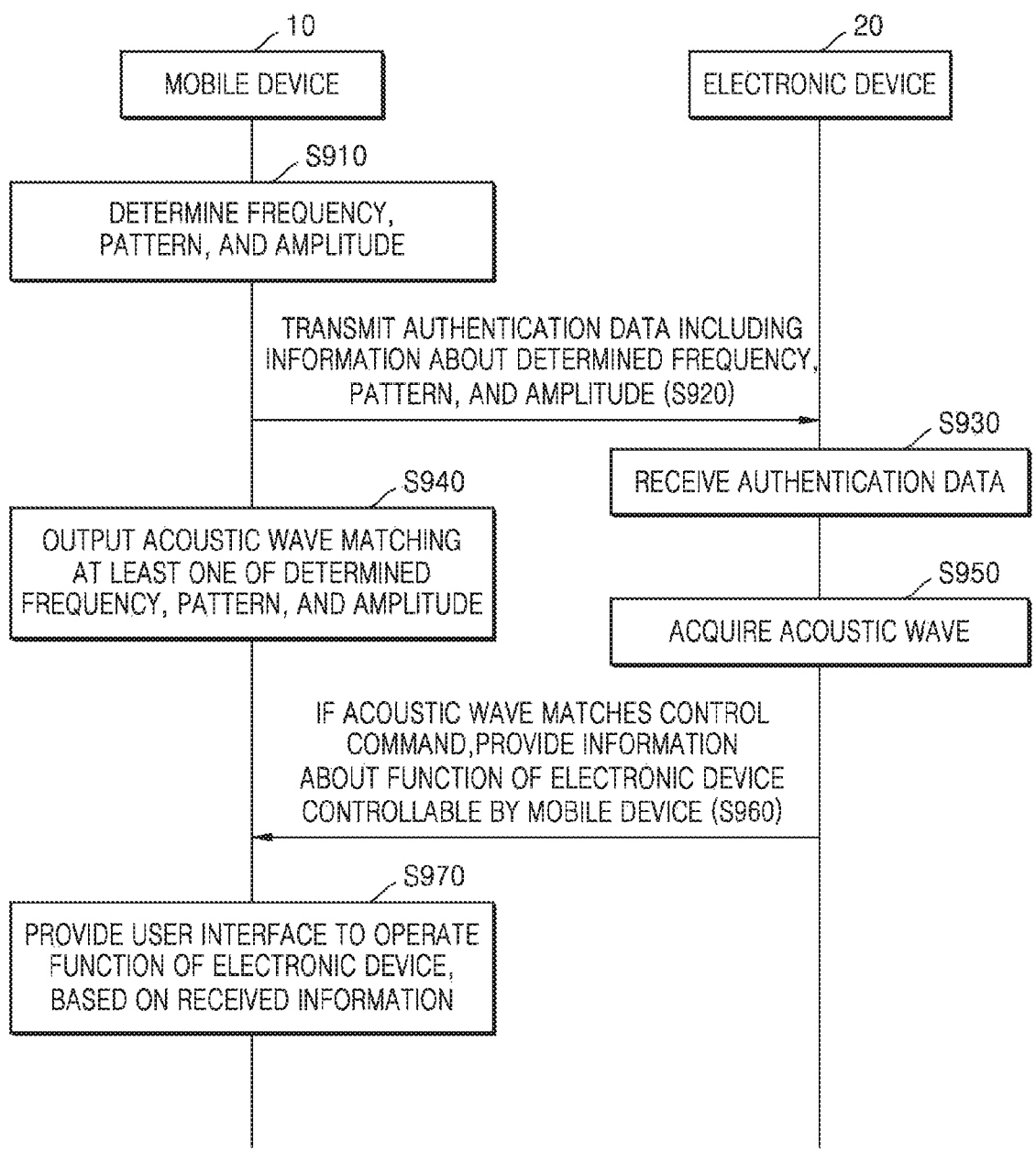
FIG. 9 is a flowchart for explaining a method of operating an electronic device control system, according to an embodiment.

FIG. 9 is a flowchart for explaining a method of operating the electronic device control system according to an embodiment. The electronic device control system according to an embodiment may include the mobile device 10 and the electronic device 20, as illustrated in FIG. 1.

Referring to FIG. 9, in S910, the mobile device 10 determines the frequency, pattern, and amplitude of an acoustic wave. In detail, the mobile device 10 may determine a frequency, a pattern, and an amplitude defining an acoustic wave when a distance from the electronic device 20 is within a critical distance. The critical distance may be a communication coverage, such as, a Bluetooth communication coverage or a Wi-Fi communication coverage, which is determined by a wireless communication technique. Furthermore, the critical range may be a preset value. Furthermore, the critical range may be determined according to the type of the electronic device 20. For example, the mobile device 10 may determine the critical range by using information indicating device type of the electronic device 20 acquired when pairing to the electronic device 20 is performed.

The mobile device 10 may randomly determine the frequency and pattern of an acoustic wave. Furthermore, the mobile device 10 may determine the amplitude of the acoustic wave according to an ambient noise level of the mobile device 10. In this state, the mobile device 10 may receive ambient sound, that is, an acoustic wave, and measure a decibel dB of the received ambient sound. Since the method of determining the frequency, pattern, and amplitude of an acoustic wave by the mobile device 10 corresponds to the method of operating the controller 210 of FIG. 2, a detailed description thereof is omitted.

In S920, the mobile device 10 transmits authentication data including information about the determined frequency, pattern, and amplitude, to the electronic device 20.

Furthermore, in some embodiments, the mobile device 10 may select one of previously stored acoustic waves, and generate authentication data including information about the frequency, pattern, and amplitude of a selected acoustic wave. Furthermore, the mobile device 10 may generate an acoustic wave according to a preset acoustic wave generation algorithm, and generate authentication data including information about the frequency, pattern, and amplitude of a generated acoustic wave.

In S930, the electronic device 20 may receive authentication data including information about at least one of the frequency, pattern, and amplitude of an acoustic wave, from the mobile device 10.

In S940, the mobile device 10 outputs an acoustic wave having at least one of the frequency, pattern, and amplitude determined in S910. For example, the mobile device 10 may generate an acoustic wave having at least one of the frequency, pattern, and amplitude determined in S910, and output a generated acoustic wave. Furthermore, the mobile device 10 may select an acoustic wave having at least one of the determined frequency, pattern, and amplitude, from among the previously stored acoustic waves, and output a selected acoustic wave.

In S950, the electronic device 20 acquires an acoustic wave. Furthermore, the electronic device 20 may acquire information about the frequency, pattern, and amplitude of an acquired acoustic wave, by analyzing the acquired acoustic wave.

In S960, when the acquired acoustic wave matches the authentication data, the electronic device 20 transmits to the mobile device 10 data including information about the functions of the electronic device 20 controllable by the mobile device 10.

In detail, matching of the acquired acoustic wave with the authentication data may signify that the frequency and pattern of the acquired acoustic wave match the information about the frequency and the information about the pattern included in the authentication data. The above matching may include not only a case in which the frequency and pattern of the acquired acoustic wave are the same as information about the frequency and information about the pattern included in the control command, but also a case of being within a certain error range, for example, an error range of about ±5%.

Accordingly, when the controller 410 determines the analyzed frequency and pattern match the information about the frequency and the information about the pattern included in the authentication data, the electronic device 20 may transmit to the mobile device 10 data including information about which functions of the electronic device 20 are controllable by the mobile device 10. The information about the functions of the electronic device 20 provided to the mobile device 10 may include the format information of the control command and OPCODE for each function, which are performable by the controller 410 of the electronic device 20.

In some embodiments, when the acquired acoustic wave matches the authentication data, the electronic device 20 may determine the position of the mobile device 10. For example, the electronic device 20 may determine a relative position of the mobile device 10, by comparing the amplitudes of acoustic waves acquired by a plurality of acoustic wave acquiring devices.

Furthermore, the electronic device 20 may extract information about some functions controllable by the mobile device 10 based on the information about the position of the mobile device 10, and provide the extracted information to the mobile device 10.

In some embodiments, when the authentication data received from the mobile device 10 includes the user identification information stored in the mobile device 10, the electronic device 20 may determine the permission level of the mobile device 10 based on the user identification information. In this state, the permission level of the mobile device 10 may be a value related to the functions of the electronic device 20 controllable by the mobile device 10. For example, as the permission level decreases, the functions of the electronic device 20 controllable by the mobile device 10 may be further restricted. The method of providing the information about the functions to the mobile device 10 by using permission level by the electronic device 20 is described later in detail with reference to FIG. 11.

In S970, the mobile device 10 may provide a user interface to control the function of the electronic device 20, based on the received information about the functions of the electronic device 20. For example, the mobile device 10 may display a GUI to control the functions of the electronic device 20 on the screen of the mobile device 10. Furthermore, the mobile device 10 may output voice prompts for controlling the functions of the electronic device 20.

When a user input, for example, a touch input, or a voice input, with respect to the user interface is received, the mobile device 10 may transmit a control command corresponding to the user input to the electronic device 20. Accordingly, the mobile device 10 may control the functions of the electronic device 20.

Figure 10:
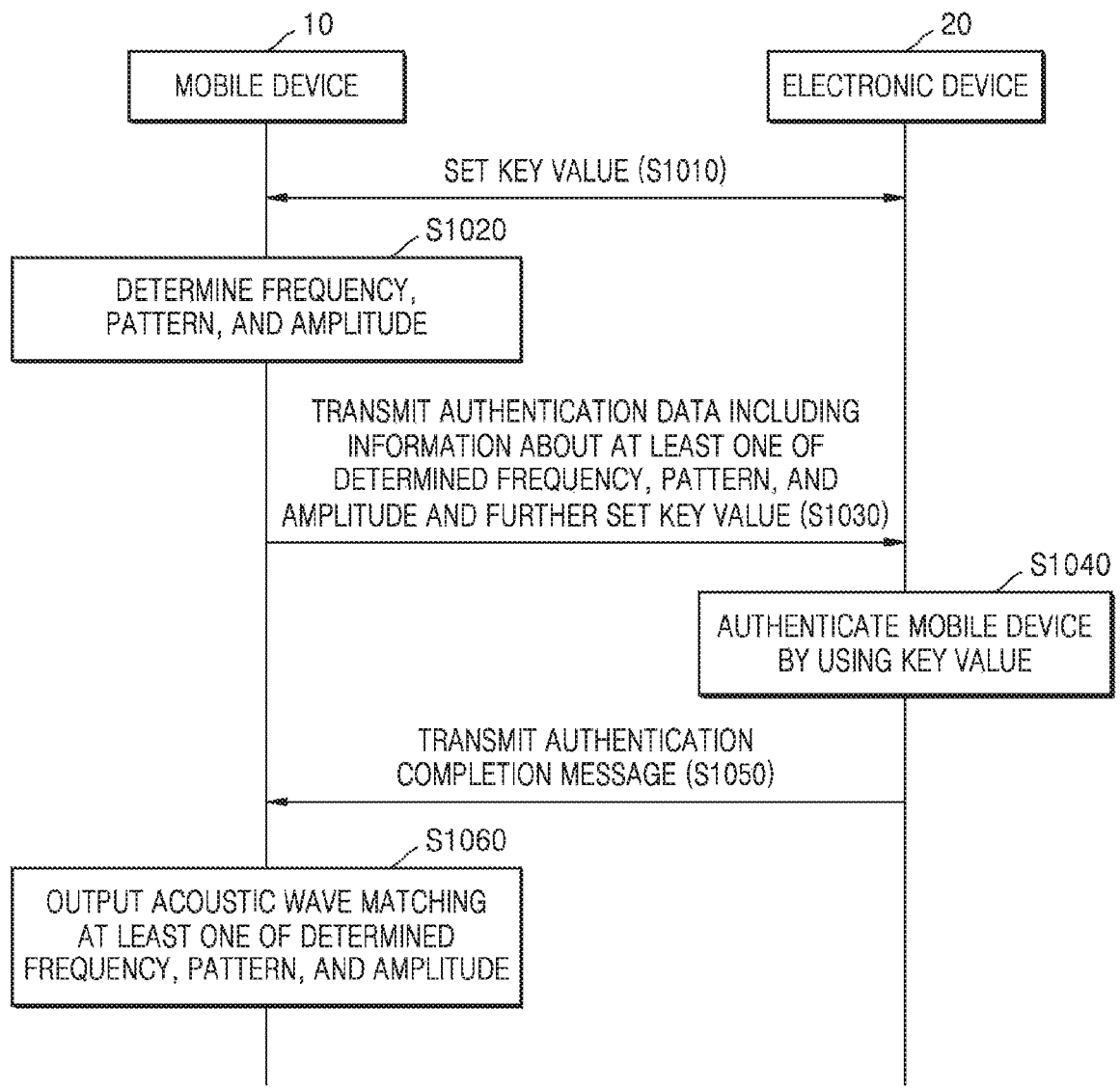
FIG. 10 is a flowchart for explaining a method, according to an embodiment, by which an electronic device control system authenticates a mobile device by using a key value.

FIG. 10 is a flowchart for explaining a method, according to an embodiment, by which the electronic device control system authenticates a mobile device by using a key value.

Referring to FIG. 10, in S1010, the mobile device 10 and the electronic device 20 set a key value. The key value may be a set of numbers, letters, and symbols.

In detail, the mobile device 10 and the electronic device 20 may set a key value when both devices make first communication. For example, when a user of the mobile device 10 installs and executes a certain application capable of controlling the electronic device control system in the mobile device 10, the mobile device 10 may set a key value with the electronic device 20. Furthermore, the mobile device 10 and the electronic device 20 may set a key value when performing a pairing operation therebetween.

In S1020, the mobile device 10 may determine the frequency, pattern, and amplitude of an acoustic wave. Since the operation S1020 corresponds to the operation S910 of FIG. 9, a detailed description thereof is omitted.

In S1030, the mobile device 10 may transmit authentication data including information about at least one of the determined frequency, pattern, and amplitude and further the key value set in S1010, to the electronic device 20.

In some embodiments, the mobile device 10 may encrypt the preset key value, and transmit authentication data including encrypted key information to the electronic device 20. For example, the mobile device 10 may encrypt the key value by using a preset encryption algorithm when the mobile device 10 and the electronic device 20 make first communication or perform a pairing operation therebetween.

In S1040, the electronic device 20 may authenticate the mobile device 10 by using the key value included in the authentication data. For example, the electronic device 20 may authenticate the key value by using a preset authentication algorithm.

When an authentication result is true, the electronic device 20 may transmit an authentication completion message to the mobile device 10, in S1050. The mobile device 10 receiving the authentication completion message may output an acoustic wave having at least one of the determined frequency, pattern, and amplitude, in S1060. Since the operation S1060 corresponds to the operation S940 of FIG. 9, a detailed description thereof is omitted.

However, when the authentication result in the operation S1040 is false, the electronic device 20 may transmit a message indicating that the mobile device 10 is not authenticated, to the mobile device 10, and may perform no more work.

Figure 11:
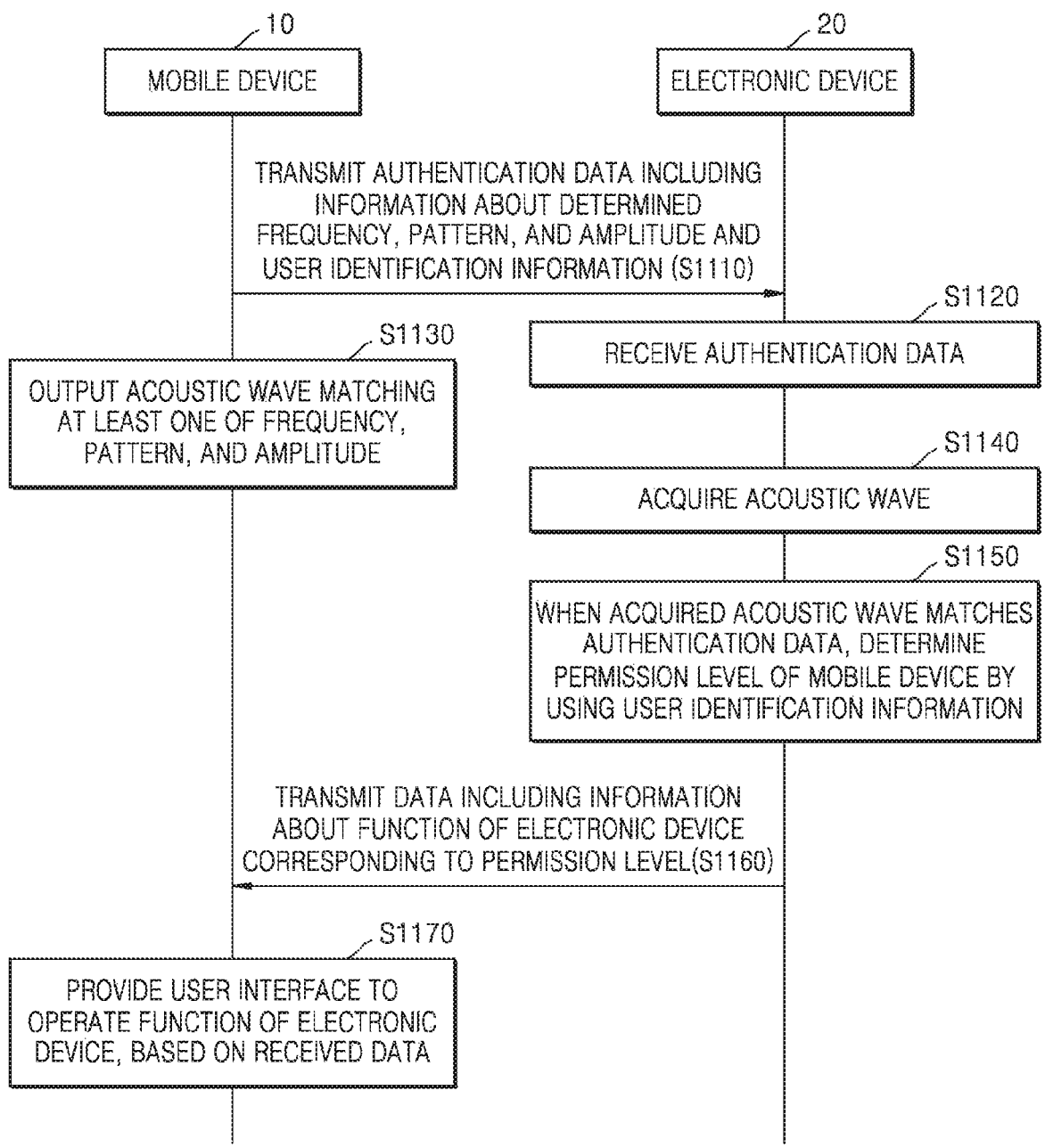
FIG. 11 is a flowchart for explaining a method, according to an embodiment, by which an electronic device control system provides a user interface for controlling a function of an electronic device based on user identification information stored in a mobile device.

FIG. 11 is a flowchart for explaining a method according to an embodiment, by which the electronic device control system provides a user interface for controlling a function of the electronic device 20 based on user identification information stored in the mobile device 10.

Referring to FIG. 11, in S1110, the mobile device 10 may transmit to the electronic device 20 authentication data including the information about the determined frequency, pattern, and amplitude and the user identification information stored in the mobile device 10. The user identification information may be, for example, the name, ID, nickname, or unique ID number of a user using the mobile device 10, and may include information about age, gender, or position of the user. Since the operation S1110 corresponds to the operation S920 of FIG. 9, a detailed description thereof is omitted.

In S1120, the electronic device 20 may receive the authentication data from the mobile device 10.

In S1130, the mobile device 10 may output an acoustic wave having at least one of the frequency, pattern, and amplitude determined in S1110.

In S1140, the electronic device 20 acquires the acoustic wave.

In S1150, when the acquired acoustic wave matches the authentication data, the electronic device 20 may determine the permission level of the mobile device 10, based on the user identification information stored in the mobile device 10. The permission level of the mobile device 10 may be a value related to the functions of the electronic device 20 controllable by the mobile device 10. For example, the electronic device 20 may determine the permission level of the mobile device 10 based on the permission level for user identification information of a user preset to the electronic device 20. Furthermore, the electronic device 20 may dynamically adjust the permission level of the mobile device 10 according to the user identification information stored in the mobile device 10.

In S1160, the electronic device 20 may transmit information about the functions of the electronic device 20 corresponding to the permission level, to the mobile device 10. For example, as illustrated in FIG. 7A, the electronic device 20 may provide the information about the functions of the electronic device 20 set for each permission level, to the mobile device 10.

In S1170, the mobile device 10 may provide a user interface to control the functions of the electronic device 20, based on the received information about the functions of the electronic device 20.

Figure 12:
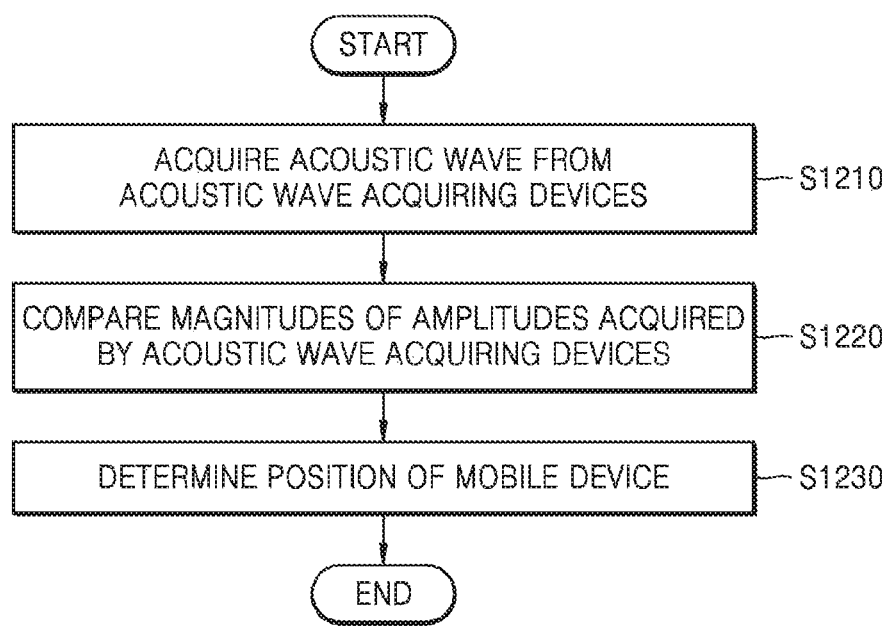
FIG. 12 is a flowchart for explaining a method, according to an embodiment, by which an electronic device determines positional information of a mobile device.

FIG. 12 is a flowchart for explaining a method according to an embodiment, by which the electronic device 20 determines positional information of the mobile device 10.

Referring to FIG. 12, the electronic device 20 may include a plurality of acoustic wave acquiring devices. Accordingly, in S1210, the electronic device 20 may acquire acoustic waves from the acoustic wave acquiring devices. The acoustic wave acquiring devices may be, for example, microphones. Furthermore, the acoustic wave acquiring devices may be arranged in the electronic device 20 to be spaced apart from each other.

In S1220, the electronic device 20 may compare the magnitudes of amplitudes of the acoustic waves acquired by the acoustic wave acquiring devices.

In S1230, the electronic device 20 may determine the position of the mobile device 10 based on the comparison.

For example, when the amplitude of an acoustic wave acquired by a first acoustic wave acquiring device located at a first position of the electronic device 20 is greater than the amplitude of an acoustic wave acquired by a second acoustic wave acquiring device located at a second position of the electronic device 20, the electronic device 20 may determine that the mobile device 10 is located close to the first position of the electronic device 20. In the opposite case, the electronic device 20 may determine that the mobile device 10 is located close to the second position of the electronic device 20.

Figure 13:
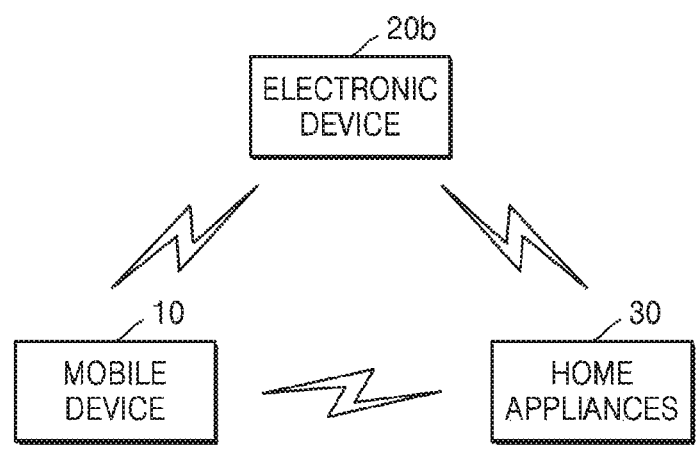
FIG. 13 is a block diagram of an electronic device control system according to another embodiment.

FIG. 13 is a block diagram of an electronic device control system according to another embodiment.

Referring to FIG. 13, the electronic device control system may further include the mobile device 10 and an electronic device 20b, and further, home appliances 30. In this state, the electronic device 20b may be coupled to a door lock device. Furthermore, the home appliances 30 may be, for example, a TV, an air conditioner, a computer, a lighting control system, or a security system.

The electronic device control system according to an embodiment may power on the home appliances 30 under the control of the mobile device 10 when the electronic device 20b opens the door lock device. The powering on the home appliances 30 may signify that power is supplied to the home appliances 30 and then the home appliances 30 start to operate.

In detail, when the electronic device 20b opens the door lock device, the electronic device 20b may transmit a control command to power on the home appliances 30 to the home appliances 30. Furthermore, when the electronic device 20b opens the door lock device, the mobile device 10 may transmit a control command to power on the home appliances 30 to the home appliances 30.

As such, as the electronic device control system is combined with the door lock device, when a user having the mobile device 10 approaches the door lock device, the door lock device opens and the home appliances 30 located inside the door lock device are controlled, thereby providing enhanced convenience to the user.

Figure 14:
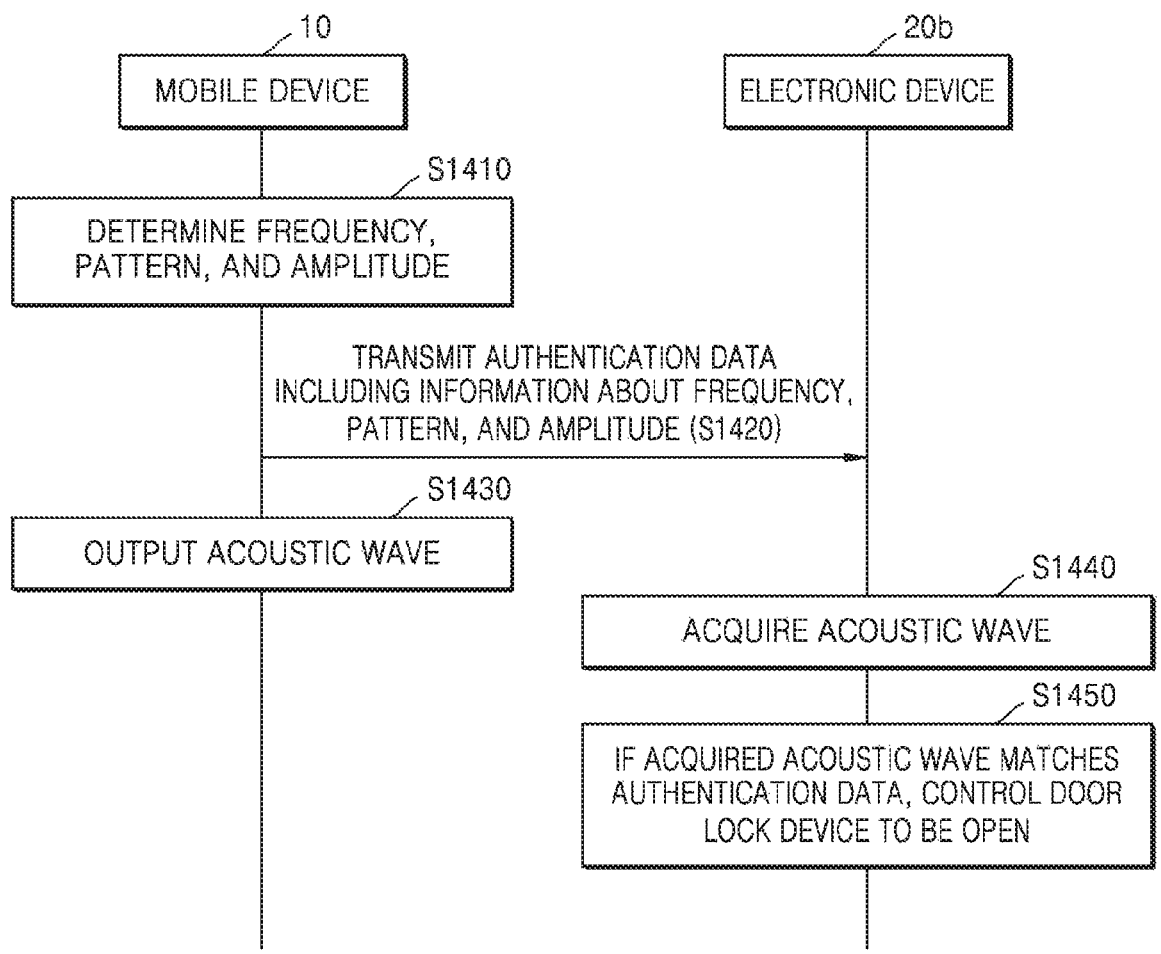
FIG. 14 is a flowchart for explaining a method, according to an embodiment, by which an electronic device opens a door lock device by using a mobile device.

FIGS. 14 and 15 are flowcharts for explaining methods of powering on a home appliance according to embodiments. Unless otherwise mentioned, the above-described contents and technical concepts are identically applied to the methods of FIGS. 14 to 15. Accordingly, redundant descriptions from FIGS. 1 to 12 are omitted.

FIG. 14 is a flowchart for explaining a method according to an embodiment, by which the electronic device 20B opens a door lock device by using the mobile device 10.

Referring to FIG. 14, in S1410, the mobile device 10 may determine the frequency, pattern, and amplitude of an acoustic wave.

In S1420, the mobile device 10 may transmit authentication data including information about the determined frequency, pattern, and amplitude.

In S1430, the mobile device 10 may output an acoustic wave having at least one of the determined frequency, pattern, and amplitude.

In S1440, the electronic device 20b may acquire an acoustic wave from the outside.

In S1450, when the acquired acoustic wave matches a control command, the electronic device 20b may control the door lock device to be opened.

In detail, the electronic device 20b may include a plurality of acoustic wave acquiring devices arranged close to the inside and outside of the door. Furthermore, the electronic device 20 may determine whether the mobile device 10 is inside of a door or outside of the door, by comparing amplitudes of the acoustic waves received from the acoustic wave acquiring devices.

When the mobile device 10 is outside of the door, the electronic device 20b may control the door lock device to be open. In contrast, when the mobile device 10 is inside of the door, the electronic device 20b may restrict the door lock device from being opened.

As such, the electronic device control system according to the present embodiment, which is combined to the door lock device, may enhance security of the door lock device.

FIG. 15 is a flowchart for explaining a method, according to an embodiment, in which the electronic device control system powers on home appliances.

Referring to FIG. 15, in S1510, the mobile device 10 may determine the frequency, pattern, and amplitude of an acoustic wave.

In S1520, the mobile device 10 may transmit authentication data including information about the determined frequency, pattern, and amplitude.

In S1530, the mobile device 10 may output an acoustic wave having at least one of the determined frequency, pattern, and amplitude.

In S1540, the electronic device 20b may acquire the acoustic wave.

In S1550, the electronic device 20b may open the door lock device when the acquired acoustic wave matches the authentication data.

In S1560, the electronic device 20b may transmit a message indicating that the door lock device is opened, to the mobile device 10.

In S1570, when the message indicating that the door lock device is opened is received, the mobile device 10 may transmit a control command to power on the home appliances 30.

In some embodiments, the mobile device 10 may display on a screen a list of home appliances including identification information of the home appliances 30, and receive a user input to select at least one of the home appliances 30. The mobile device 10 may generate a control command to power on the selected at least one home appliance, and transmit a generated control command to the selected home appliance.

In S1580, when the control command is received, the home appliances 30 may be powered on.

An operation of controlling the display 340 of FIG. 3 to display the home appliance list on the screen, an operation of controlling the input interface 350 of FIG. 3 to receive a user input, and an operation of generating a control command may be performed by the controller 310 of FIG. 3. Furthermore, an operation of transmitting a generated control command may be performed by the communicator 320 of FIG. 3.

Furthermore, although in the above description, the mobile device 10 transmits the control command to the home appliances 30, the present disclosure is not limited thereto and the electronic device 20b may transmit the control command to the home appliances 30.

The embodiments of the present inventive concept can be written as computer programs and can be implemented in general-use digital computers that execute the programs using a computer-readable recording medium.

Further, in order for the processor of the computer to execute the above-mentioned functions, when the processor needs to communicate with any other computers or servers at a remote location, the computer may further include information about how to communicate with any other computers or servers at a remote location or which information or media the processor of the computer transmits and receives at the time of the communication, by using a communication module (for example, wired and/or wireless communication module) of the computer.

Further, a functional program for implementing the present embodiment, a code and a code segment associated therewith, and the like may be easily inferred or changed by programmers in the art to which the present invention pertains in consideration of a system environment of the computer, which reads the recording medium and executes the program.

Hereinabove, examples of a computer readable recording medium recorded with programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus store and execute a computer readable code by a distributed manner. In this case, at least one computer among a plurality of distributed computers may execute a part of the above-mentioned functions and transmit the executed results to at least one of the other distributed computers, and the computer receiving the result may also execute a part of the above-mentioned functions and provide the executed results to the other distributed computers.

Although it has been described in the above that all the components of an embodiment of the present invention are coupled as a single unit or coupled to be operated as a single unit, the present invention is not necessarily limited to such an embodiment. Namely, within the purpose of the present invention, one or more components among the components may be selectively coupled to be operated as one or more units. Also, although each of the components may be implemented as an independent hardware, some or all of the components may be selectively combined with each other, so that they may be implemented as a computer program having one or more program modules for performing some or all of the functions combined in one or more hardwares. Codes and code segments forming the computer program can be easily conceived by an ordinarily skilled person in the technical field of the present invention. Such a computer program may implement the embodiments of the present invention by being stored in a computer-readable medium, and being read and executed by the computer. Storage mediums for storing the computer program may include a magnetic recording medium, or an optical recording medium.

Although exemplary embodiments of the present invention have been described for illustrative purposes, those having ordinary knowledge in the technical field of the present invention will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and it should be construed that all of the technical ideas included within the scope equivalent to the claims are included within the right scope of the present invention.

The invention claimed is:

1. A mobile device, comprising:
a communicator configured to transmit information indicating at least one of a frequency, a pattern or an amplitude to an electronic device located within a critical distance from the mobile device, transmit user identification information stored in the mobile device to the electronic device;
an acoustic wave output interface configured to output an acoustic wave corresponding to the at least one of the frequency, the pattern or the amplitude; and based on information indicating at least one function extracted from a plurality of functions of the electronic device according to a location of the mobile device being received through the communicator, a controller configured to provide a user interface to operate the at least one function extracted from the plurality of functions of the electronic device,
wherein the at least one function extracted from the plurality of the functions of the electronic device is performed in the electronic device under the control of the mobile device and is different based on the location of the mobile device, and
wherein the at least one function extracted from the plurality of functions of the electronic device are determined according to a permission level of the mobile device, the permission level being a value determined by the electronic device based on the user identification information and indicating which of the plurality of functions of the electronic device are controllable by the mobile device.

2. The mobile device of claim 1, wherein the communicator is further configured to:
transmit key information to the electronic device, and
receive, from the electronic device, an authentication completion message indicating that the mobile device is authenticated, by using the key information, and
wherein the acoustic wave output interface is further configured to output the acoustic wave when the authentication completion message is received.

3. An electronic device, comprising:
a communicator configured to receive information indicating at least one of a frequency, a pattern or an amplitude from a mobile device located within a distance from the electronic device;
an acoustic wave acquiring device configured to acquire an acoustic wave; and
a controller configured to:
extract at least one function from a plurality of functions of the electronic device based on a location of the mobile device,
provide information indicating the at least one function from the plurality of functions of the electronic device that is controllable by the mobile device, to the mobile device, when the acquired acoustic wave corresponds the at least one of the frequency, the pattern or the amplitude,
wherein the extracted at least one function is performed in the electronic device under the control of the mobile device and is different based on the location of the mobile device, and
wherein the controller is further configured to:
control the communicator to receive user identification information stored in the mobile device;
determine a permission level of the mobile device, the permission level being a value determined by the electronic device based on the user identification information and indicating which of the plurality of functions of the electronic device are controllable by the mobile device; and extract the at least one function from the plurality of functions of the electronic device according to a permission level of the mobile device.

4. The electronic device of claim 3, wherein the acoustic wave acquiring device comprises a plurality of acoustic wave acquiring devices, and
wherein the controller is further configured to determine the position of the mobile device by comparing magnitudes of amplitudes of acoustic waves acquired by the plurality of acoustic wave acquiring devices.

5. The electronic device of claim 3, wherein the controller is further configured to:
extract information indicating one or more of the functions of the electronic device based on the permission level; and
provide the extracted information to the mobile device.

6. The electronic device of claim 3, wherein the communicator is further configured to receive key information from the mobile device, and
wherein the controller is further configured to:
authenticate the mobile device by using the key information, and
when the mobile device is authenticated, control the communicator to transmit an authentication completion message to the mobile device.

7. A method of operating a mobile device, the method comprising:
transmitting information indicating at least one of a frequency, a pattern or an amplitude to an electronic device located within a critical distance from the mobile device;
transmitting user identification information stored in the mobile device to the electronic device;
outputting an acoustic wave corresponding to the at least one of the frequency, the pattern or the amplitude;
receiving information indicating at least one function extracted from a plurality of functions of the electronic device based on a location of the mobile device that is controllable by the mobile device;
providing a user interface to operate the at least one function extracted from the plurality of functions of the electronic device, based on the information being received; and
controlling the function of the electronic device via the user interface, wherein the at least one function extracted from the plurality of functions of the electronic device is performed in the electronic device under the control of the mobile device and is different based on the location of the mobile device, and
wherein the at least one function extracted from the plurality of functions of the electronic device are determined according to a permission level of the mobile device, the permission level being a value determined by the electronic device based on the user identification information and indicating which of the plurality of functions of the electronic device are controllable by the mobile device.

8. A non-transitory computer readable storage medium having stored thereon a program, which when executed by a computer, performs the method defined in claim 7.

* * * * *